(12) United States Patent
Geilich (10) Patent No.: US 7,831,382 B2
(45) Date of Patent: Nov. 9, 2010

(54) METHOD FOR DIFFERENTIATING DUPLICATE OR SIMILARLY NAMED DISJOINT LOCALITIES WITHIN A STATE OR OTHER PRINCIPAL GEOGRAPHIC UNIT OF INTEREST

(75) Inventor: Michael Geilich, Hanover, NH (US)

(73) Assignee: TeleAtlas B.V., Eindhoven (NL)

( * ) Notice: Subject to any disclaimer, the term of this patent is extended or adjusted under 35 U.S.C. 154(b) by 689 days.

(21) Appl. No.: 11/345,877

(22) Filed: Feb. 1, 2006

(65) Prior Publication Data
US 2007/0208683 A1 Sep. 6, 2007

(51) Int. Cl.
*G01C 21/30* (2006.01)
(52) U.S. Cl. ............... 701/208; 701/200; 707/724
(58) Field of Classification Search ............ 707/100, 707/10, 203, 4, 6, 7, 8, 724; 705/1, 8, 9; 701/208, 200
See application file for complete search history.

(56) References Cited

U.S. PATENT DOCUMENTS

| | | | |
|---|---|---|---|
| 4,873,513 A | 10/1989 | Soults et al. | |
| 6,691,114 B1 * | 2/2004 | Nakamura | 707/10 |
| 7,065,483 B2 * | 6/2006 | Decary et al. | 707/3 |
| 7,257,570 B2 * | 8/2007 | Riise et al. | 707/706 |
| 2002/0163547 A1 | 11/2002 | Abramson et al. | |
| 2005/0251331 A1 * | 11/2005 | Kreft | 701/207 |
| 2005/0268254 A1 | 12/2005 | Abramson et al. | |
| 2006/0200359 A1 * | 9/2006 | Khan et al. | 705/1 |
| 2007/0033089 A1 * | 2/2007 | Dharmarajan et al. | 705/9 |

OTHER PUBLICATIONS

International Search Report and Written Opinion for PCT/US07/61405, dated Feb. 14, 2008, 8 pages.

* cited by examiner

Primary Examiner—Mohammad Ali
Assistant Examiner—Thuy (Tiffany) Bui
(74) Attorney, Agent, or Firm—Jacob Eisenberg (57) ABSTRACT

A method and system for differentiating duplicate yet disjoint localities, such as cities, within a state or other principal geographic unit of interest is for use with electronic maps and databases. Duplicate locality name entries are stored in a database, locality name database entries are condensed for localities having two or more similar names, and adornments for duplicate locality names are stored in the database. In the adornment selection process, for a first duplicate locality, a second duplicate locality is selected that is closest to the first. Selected adornments are first and second significant localities, such as large cities, and are closer to the first and second duplicate localities, respectively, than the first and second duplicate localities are to each other, and are more significant than the first and second duplicate localities. Adornments to duplicate localities are displayed to the user. The process is repeated for remaining duplicate localities.

18 Claims, 8 Drawing Sheets

FIG. 1

```
If ((AN1 != AN2) AND              /* Rule 1 */
    (d[N1, N2] > d[N1, AN1]) AND  /* Rule 2 */
    (d[N1, N2] > d[N2, AN2]) AND  /* Rule 3 */
    (d[AN1, AN2] > d[N1, AN1]) AND /* Rule 4 */
    (d[AN1, AN2] > d[N2, AN2]) AND /* Rule 5 */
    (d[N1, AN2] > d[N1, AN1]) AND /* Rule 6 */
    (d[N2, AN1] > d[N2, AN2]) AND /* Rule 7 */
    (p[AN1] > p[N1]) AND          /* Rule 8 */
    (p[AN2] > p[N2]))             /* Rule 9 */
{
    adorn N1 with AN1;
    adorn N2 with AN2;
}
```

METHOD FOR DIFFERENTIATING DUPLICATE OR SIMILARLY NAMED DISJOINT LOCALITIES WITHIN A STATE OR OTHER PRINCIPAL GEOGRAPHIC UNIT OF INTEREST

FIELD OF THE INVENTION

The present invention relates to map databases having information for determining localities and, more particularly, to map databases having a data structure that is used for differentiating duplicate or similarly named disjoint localities for a location desired by a user.

BACKGROUND OF THE INVENTION

In recent years, consumers have been provided with a variety of devices and systems to enable them to locate specific street addresses on a digital map. These devices and systems are in the form of in-vehicle navigation systems that enable drivers to navigate over streets and roads, portable hand-held devices such as personal digital assistants ("PDAs"), personal navigation devices and cell phones that can do the same, and Internet applications in which users can generate maps showing desired locations. The common aspect in all of these and other types of devices and systems is a map database of geographic features and software to access and manipulate the map database in response to desired user inputs. Essentially, in all of these devices and systems a user can enter a desired location and the returned result will be the position of the desired location. Typically, users will enter an address, the name of a business, such as a restaurant, or a destination landmark, such as the Golden Gate Bridge, and then be returned the location of the requested place. The location may be shown on a map display, or may be used to calculate and display driving directions to the location, or used in other ways.

One problem occurs when a user requests a location having a locality name that is a duplicate of another locality name yet disjoint from the other locality name. A locality is, for example, a city or town within a state, province, county, or other principal geographic unit of interest. Duplicate localities are physically disjoint if they are not contiguous, do not overlap, and are not adjacent. Disjoint localities also do not have any common geographic items, such as street segments, which are portions of streets broken into blocks of street numbers or into other units.

In the United States of America, for example, duplicate yet disjoint localities within a state are common. There are two cities named Washington, New Jersey, and two cities named Burbank, California. There are ten cities named Five Points, Pennsylvania. When duplicate localities have a street name in common, for example when duplicate localities have a street called "Main Street," a software application needs more information from the user in order to determine which locality the user meant.

An extension of this problem occurs when one of the duplicate localities is known by two or more similar names. For example, Ho-Ho-Kus, New Jersey, may be known by various names, such as Ho-Ho-Kus, Ho Ho Kus or Ho-Ho-Kus (Hohokus), as locality names come from many sources, including administrative, postal, and colloquial sources. Currently, map databases are unable to effectively condense similar names for a locality into a single entry. A map database containing entries for localities, many of which also each have entries for similar names, will have an index that is unwieldy in size for limited-memory navigation devices. Ideally, similar names for a locality would be condensed into a single entry if and only if they represent the same entry. A user who enters Ho-Ho-Kus, Ho Ho Kus or Ho-Ho-Kus (Hohokus) would then find HO HO KUS, as well as duplicate HO HO KUS localities if any exist.

In applications within the United States, a standard method for distinguishing duplicate locality names within the same state or other principal geographic unit of interest is to adorn the duplicates with the name of the county or counties comprising the locality. For example, when a user selects Washington, NJ, MapQuest (www.mapquest.com) adorns the duplicate names with the counties in which they are located, such as Washington, NJ, Warren, US and Washington, NJ, Burlington, US, where Warren and Burlington are counties in New Jersey.

Generally, localities with duplicate names exist in disjoint counties, and therefore county name is distinguishing information that allows an application to determine the unique desired location. One shortcoming of this approach within the United States or Canada is that the location of counties is not widely known outside of a user's local area. Therefore, adorning locality names with county names can force users to choose between unknown locations. This approach is not a particularly useful or robust method of distinguishing similarly named yet disjoint localities for navigation applications. In the United Kingdom, counties play the role of states or provinces in North America, and thus their boundaries are much better known. At the same time, however, the United Kingdom has endemic duplication, overlap and ambiguity of duplicate place names, so that the present approach has serious shortcomings there also.

There is a need to effectively distinguish duplicate yet disjoint localities in the same principal geographic unit of interest, for example a state, in order for map databases to be usable with maximum effectiveness. Instead of adorning duplicate yet disjoint localities with counties, what is needed is a method of adorning duplicate yet disjoint localities with nearby significant cities or towns, such as large cities in close proximity to the duplicate localities that are more likely to be recognizable to the user. Ideally, each duplicate locality would be separately indexed and stored into a map database for use by a software application. There is also a need for adorning a locality with a nearby significant city or town for a user's ease of use, even if not for the purpose of disambiguation of duplicate localities. For a locality having two or more similar names that identify it, there is a need for a way to condense the localities into a single entry in a map database if and only if they represent the same entry, in order to reduce the index size of the database.

SUMMARY OF THE INVENTION

Generally described, the invention presents a method and system for differentiating duplicate yet disjoint localities within a state or other principal geographic unit of interest for use with electronic maps and electronic map databases. The invention adorns similarly named localities with the names of nearby larger cities that should be recognizable to users of systems, devices and software that use map databases. In one embodiment, duplicate locality names describing mutually disjoint localities are indexed and stored in a map database. Duplicate localities are checked to ensure they do not overlap and are not adjacent by examining the geographic items contained in each and ensuring that there are no common geographic items. Localities having similar but not duplicate names will be indexed and stored in the map database as a single entry using one or more techniques including tokenizing, normalizing, optimizing, and matching the similar names.

According to embodiments of the present invention, for a first unadorned duplicate locality, the process selects a second unadorned duplicate locality that is closest to the first unadorned duplicate locality. First and second significant localities are selected that are closer to the first and second unadorned duplicate localities, respectively, than the first and second unadorned duplicate localities are to each other. The first and second significant localities are also more significant than both the first and second unadorned duplicate localities. According to embodiments of the invention, the significant localities are cities. According to embodiments of the invention, the first and second unadorned duplicate localities are adorned with the first and second significant localities, respectively, for displaying to the user. The process is repeated for remaining pairs of unadorned duplicate localities. Adornments for the duplicate localities are also indexed and stored in a map database.

DETAILED DESCRIPTION

Figure 1:
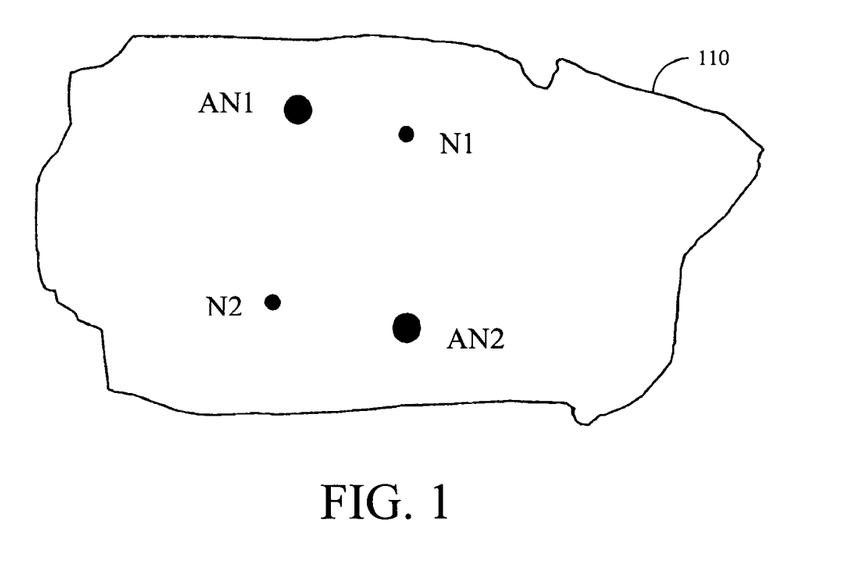
FIG. 1 illustrates an example of two duplicate yet disjoint localities, N1 and N2, in a fictitious principal geographic unit of interest, as well as example significant nearby localities, AN1 and AN2, which adorn localities N1 and N2, respectively.

FIG. 1 illustrates an example of two duplicate yet disjoint localities, N1 and N2, in a fictitious principal geographic unit of interest 110, as well as example significant nearby localities, AN1 and AN2, which adorn localities N1 and N2, respectively. The adornment process is provided in more detail in the following discussion of the other figures.

Figure 2:
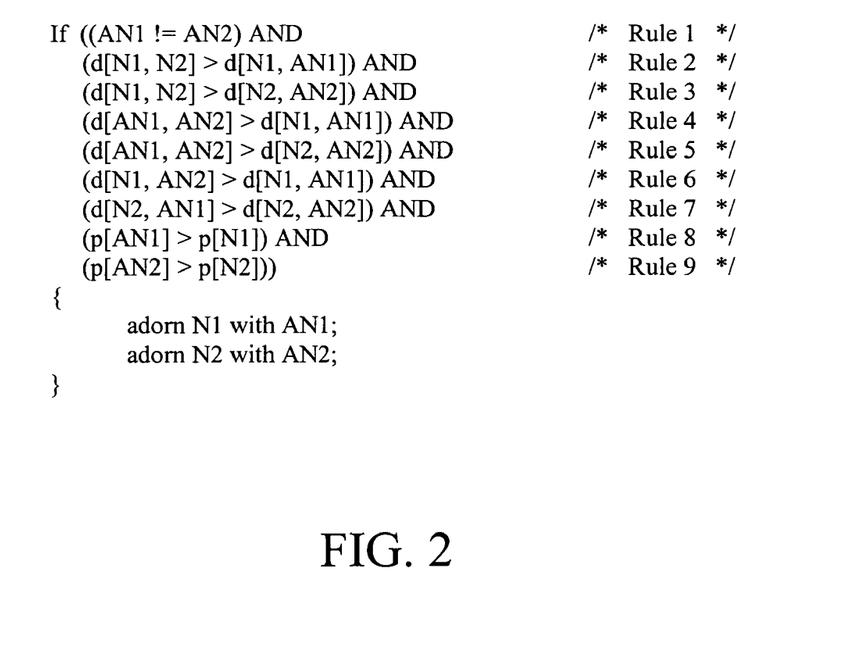
FIG. 2 illustrates an embodiment of the rules involved for selecting adornments AN1 and AN2 for a pair of duplicate localities N1 and N2, respectively, within a principal geographic unit of interest.

FIG. 2 illustrates an embodiment of the rules involved for selecting adornments AN1 and AN2 for a pair of duplicate localities N1 and N2, respectively, within a geographic unit of interest. Many algorithms for determining the adornments for N1 and N2 are possible. Both AN1 and AN2 are located in the same geographic unit of interest as N1 and N2. Embodiments of the invention adorn localities with more helpful names of nearby big cities or other significant localities. As shown in FIG. 2, the function d[ ] returns the distance between two localities and the function p[ ] determines the significance of a locality name. According to embodiments of the invention, the adornment AN1 for N1 and the adornment AN2 for N2 are valid adornments only if each of the following rules evaluate to true:

Rule 1. AN1!=AN2. The name AN1 must not be a duplicate of name AN2.

Rule 2. d[N1, N2]>d[N1, AN1]. The distance from N1 to N2 must be greater than the distance from N1 to AN1.

Rule 3. d[N1, N2]>d[N2, AN2]. The distance from N1 to N2 must be greater than the distance from N2 to AN2.

Rule 4. d[AN1, AN2]>d[N1, AN1]. The distance from AN1 to AN2 must be greater than the distance from N1 to AN1.

Rule 5. d[AN1, AN2]>d[N2, AN2]. The distance from AN1 to AN2 must be greater than the distance from N2 to AN2.

Rule 6. d[N1, AN2]>d[N1, AN1]. The distance from N1 to AN2 must be greater than the distance from N1 to AN1.

Rule 7. d[N2, AN1]>d[N2, AN2]. The distance from N2 to AN1 must be greater than the distance from N2 to AN2.

Rule 8. p[AN1]>p[N1]. AN1 must be a more significant locality than N1.

Rule 9. p[AN2]>p[N2]. AN2 must be a more significant locality than N2.

According to embodiments of the invention, various techniques exist for determining the closeness of two localities, for example N1 and AN1. In one embodiment of the invention, the distance between city centers is determined. In another embodiment, it is determined which geographic items in each of the two localities are nearest to each other, and then the distance of these two geographic items is determined. Examples of geographic items are streets, street segments, landmarks, state parks, highways, business locations and residential locations.

According to embodiments of the invention, a more significant locality is one which is most likely to be recognizable to users. In one embodiment, significance is defined as the number of locality name sources in which the locality name can be found. Some examples of these locality name sources are 1) Federal Information Processing Standards 55 (FIP5S55), 2) United States Postal Service (USPS) City Place Names, 3) Points of Interests (POIs) for City Centers, 4) POIs for USPS Post Offices, 5) County Subdivisions in TIGER, 6) incorporated places in TIGER, 7) the United States Geological Survey (USGS) Geographic Names Information System (GNIS) and 8) USPS City Place Names listed as postal options in the USPS City State File. In another embodiment, significance is defined as the number of geographic items, for example street segments, in a locality. In another embodiment, the significance of a locality is determined by a primary sort based on the number of locality name sources in which the locality name can be found, and where necessary, by a secondary sort based on the number of geographic items located within the locality. Alternatively, significance is defined as the number of major geographic items located within the locality, as opposed to the number of geographic items located within the locality. An example of a major geographic item is an important highway.

According to embodiments of the invention, the significant localities are cities. According to Rule 8 of FIG. 2, the adornment locality of AN1 should thus be more significant than the locality N1. One advantage of adorning with the names of significant localities is that, even if the user does not know where these adornments are located, they are easily found on a road map. The location of counties, on the other hand, is not widely known outside of a user's local area. Thus, in many cases, county names are not as readily found on a road map. In another embodiment, while names of more significant localities make the best adornments, equally or less significant locality names can also be used. In another embodiment, names of other geographic features, such as landmark names, could also be used for adornments.

Figure 3:
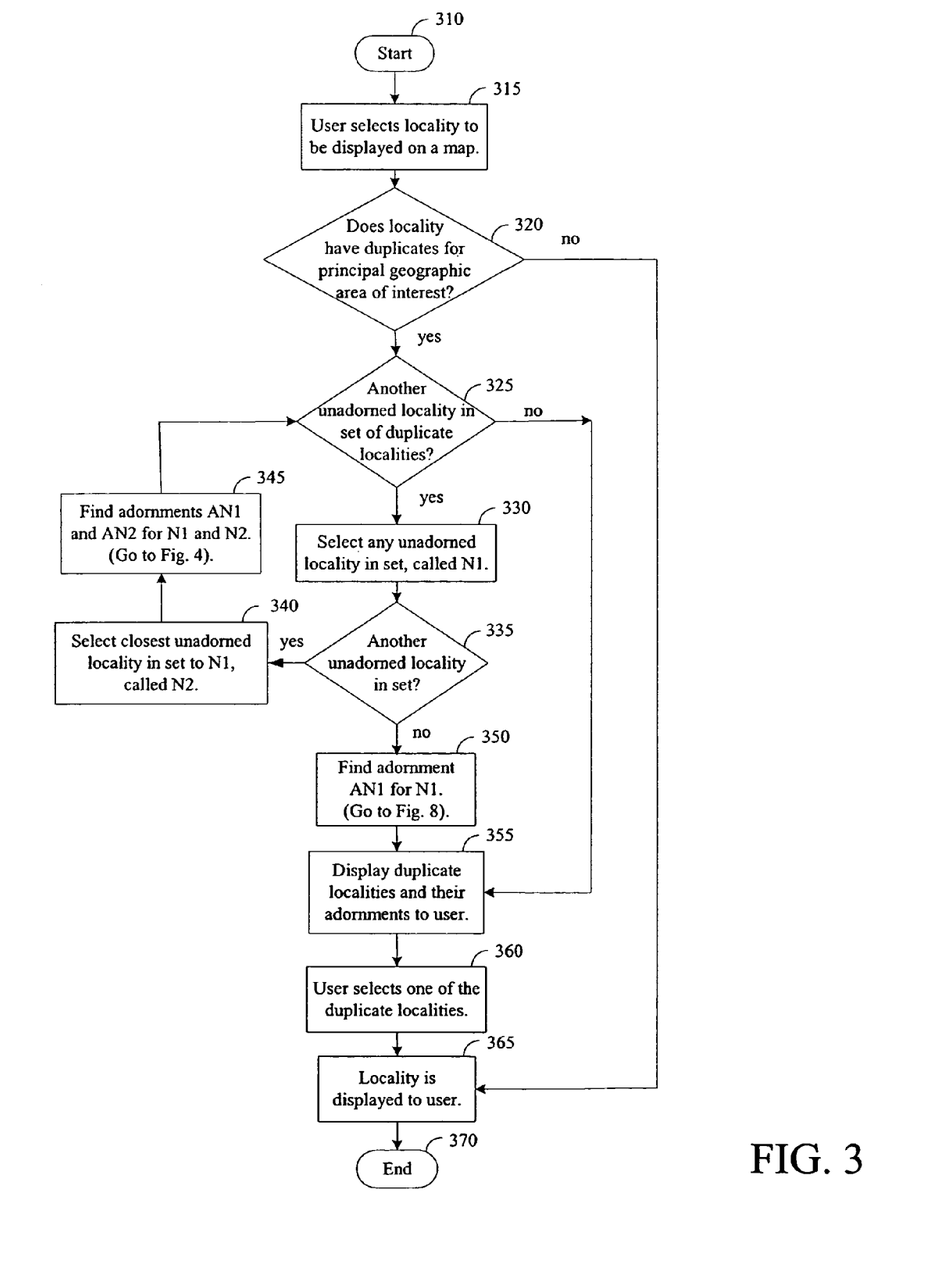
FIG. 3 show an embodiment of a flowchart for a process that processes pairs of duplicate localities for a principal geographic unit of interest.

FIG. 3 shows an embodiment of a flowchart for a process that processes pairs of duplicate localities for a principal geographic unit of interest. According to embodiments of the invention, the adornment is performed automatically. The process starts in step 310 and the user selects a locality to be displayed on a map in step 315. Alternatively, if the user requests driving directions, for example, the locality can be either the starting or ending locality.

In step 315, in one embodiment, the type of software application that queries the user is a drill-down application. This type of application first requests the user to enter a principal geographic unit of interest, for example a state or province. The application then requests the user enter a locality, for example a city or town, located in the principal geographic unit of interest. The application then requests the user to enter the name of the street in the locality. Finally, the application requests the user to enter the street number. In most cases, the queries result in specification of an unambiguous locality, when the user enters the locality. Thus, in FIG. 3, if the locality entered by the user does not have duplicates for the principal geographic area of interest in step 320, the process displays the locality to the user in step 365, and the process ends in step 370. If duplicate localities exist for the geographical unit of interest in step 320 of FIG. 3, then the process continues in step 325.

In step 315, in another embodiment, the software application is not a drill-down application and instead queries the user for street number and street, locality and principal geographic unit of interest at one time. In most cases, the query results in specification of an unambiguous locality. Thus in FIG. 3, if the locality entered by the user does not have duplicates for the principal geographic are of interest in step 320, the process displays the locality to the user in step 365 and the process ends in step 370. If the user enters a street name of "Main Street," for example, in this embodiment of the application, a duplicate locality will be found only if it also has a street by the name of "Main Street." For FIG. 3, if duplicate localities exist for the geographical unit of interest in step 320 of FIG. 3, then the process continues in step 325.

In step 325, the set of duplicate localities at this point are all unadorned by other localities. Thus, if another unadorned locality exists in the set of duplicate localities, the process proceeds to step 330. In step 330, one of the unadorned localities in the set is selected and called N1. If another unadorned locality exists in the set of duplicate localities in step 335, then in step 340, the closest unadorned locality in the set to N1 is selected and called N2. In step 345, the process connects to FIG. 4, in which adornments AN1 and AN2 are then found for N1 and N2.

Figure 4:
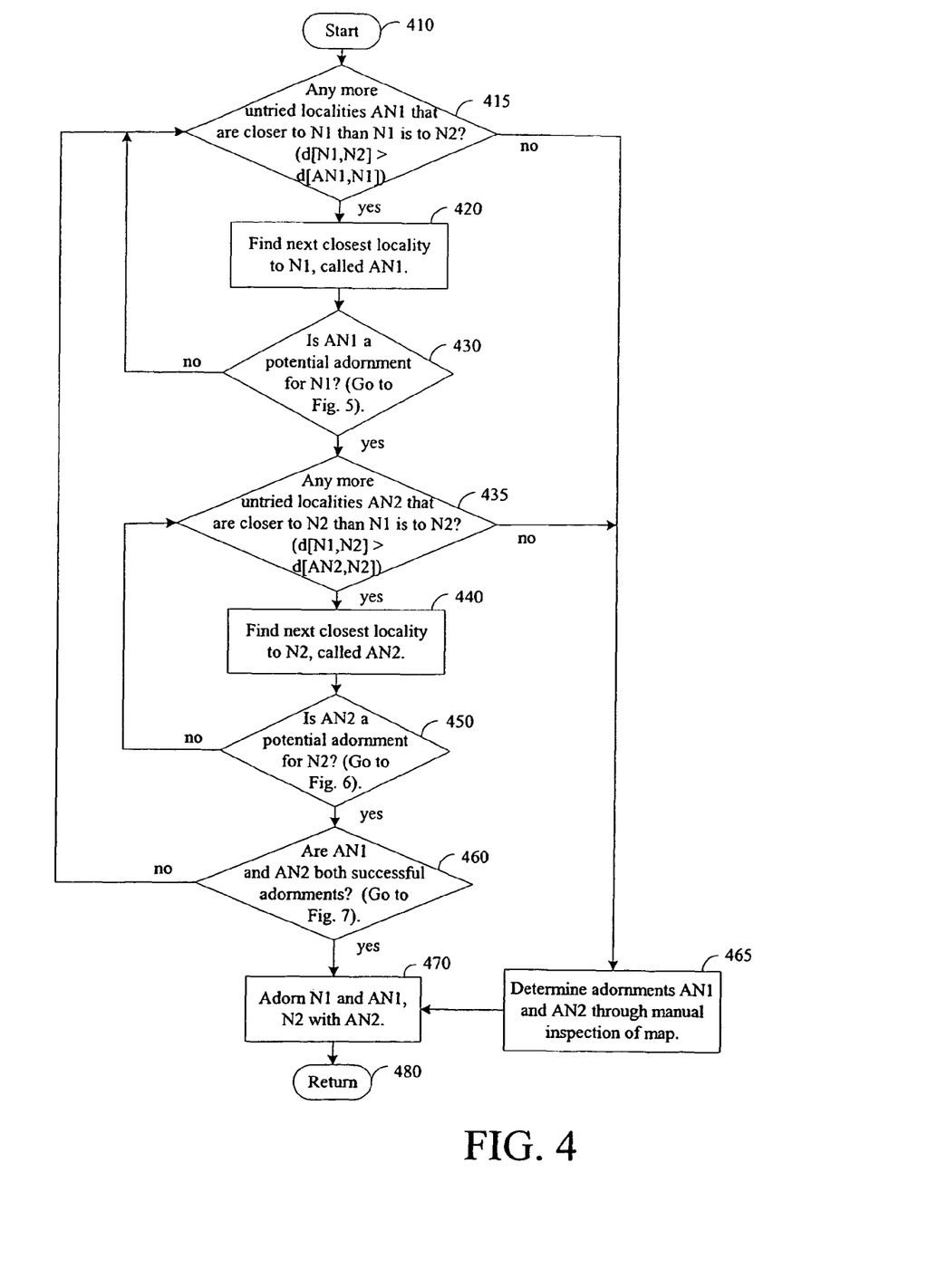
FIG. 4 shows an embodiment of a flowchart for FIG. 3 subprocess 345, which selects adorning localities AN1 and AN2 for duplicate localities N1 and N2 within a principal geographic unit of interest.

FIG. 4 shows an embodiment of a flowchart for FIG. 3 subprocess 345, which selects adorning localities AN1 and AN2 for duplicate localities N1 and N2 within a principal geographic unit of interest. The subprocess starts in step 410 by determining whether any more untried adorning localities AN1 exist that are closer to N1 than N1 is to N2, or where d[N1, N2] >d[AN1, N1] in step 415. If such untried adorning localities AN1 exist in step 415, the subprocess finds the next closest significant locality to N1, called AN1 in step 420. In step 430, the subprocess connects to FIG. 5 to determine if AN1 is a potential adornment for N1.

Figure 5:
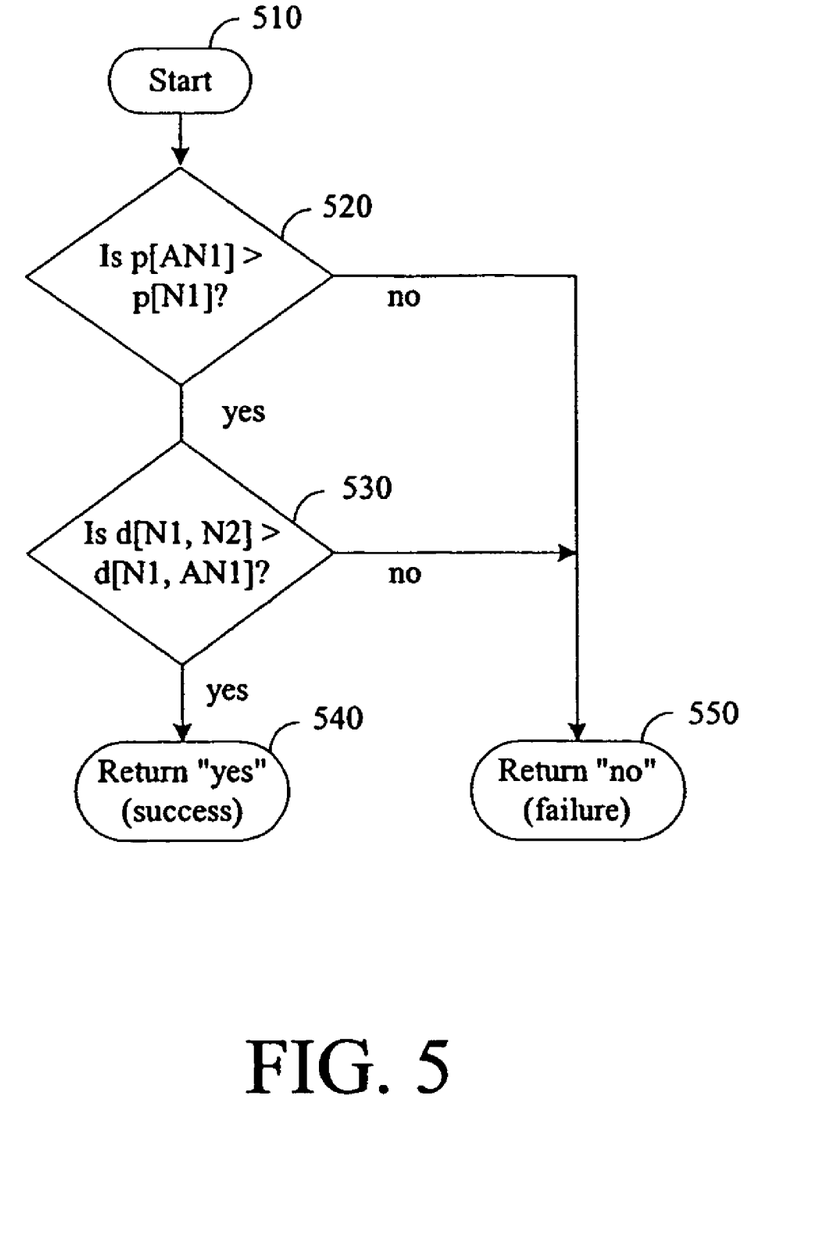
FIG. 5 shows an embodiment of a flowchart for FIG. 4 subprocess 430, which determines if a first adorning locality candidate AN1 is a potential adornment for a first duplicate locality N1.

FIG. 5 shows an embodiment of a flowchart for FIG. 4 subprocess 430, which determines if a first adorning locality candidate AN1 is a potential adornment for a first duplicate locality N1. The subprocess starts in step 510. If in step 520, taking Rule 8 from FIG. 2, if p[AN1]>p[N1], meaning that if AN1 is a more significant locality than N1, then the subprocess proceeds to step 530. If in step 520, AN1 is not a more significant locality than N1, the subprocess returns "no" or failure to FIG. 4 in step 550. In step 530, taking Rule 2 from FIG. 2, if d[N1, N2]>d[N1, AN1], meaning that if the distance from N1 to N2 is greater than the distance from N1 to AN1, then in step 540, the subprocess returns "yes" or success to FIG. 4.

In step 430 of FIG. 4, if AN1 is not a potential adornment for N1, the subprocess goes back to step 415, in which the subprocess determines whether any more untried adorning localities AN1 exist that are closer to N1 than N1 is to N2, or where d[N1, N2]>d[AN1, N1]. If in step 415 the subprocess determines that no more untried adorning localities AN1 exist that are closer to N1 than N1 is to N2, then in step 465, adornments AN1 and AN2 for N1 and N2, respectively, are determined manually through human inspection of a map. In step 470, N1 is adorned with AN1, and N2 is adorned with AN2. The subprocess then returns to FIG. 3 in step 480.

If in step 430 AN1 is a potential adornment for N1, the subprocess then determines whether any more untried adorning localities AN2 exist that are closer to N2 than N1 is to N2, or where d[N1, N2]>d[AN2, N2] in step 435. If such untried adorning localities AN1 exist in step 435, the subprocess finds the next closest locality to N2, called AN2, in step 440. In step 450, the subprocess connects to FIG. 6 to determine if AN2 is a potential adornment for N2.

Figure 6:
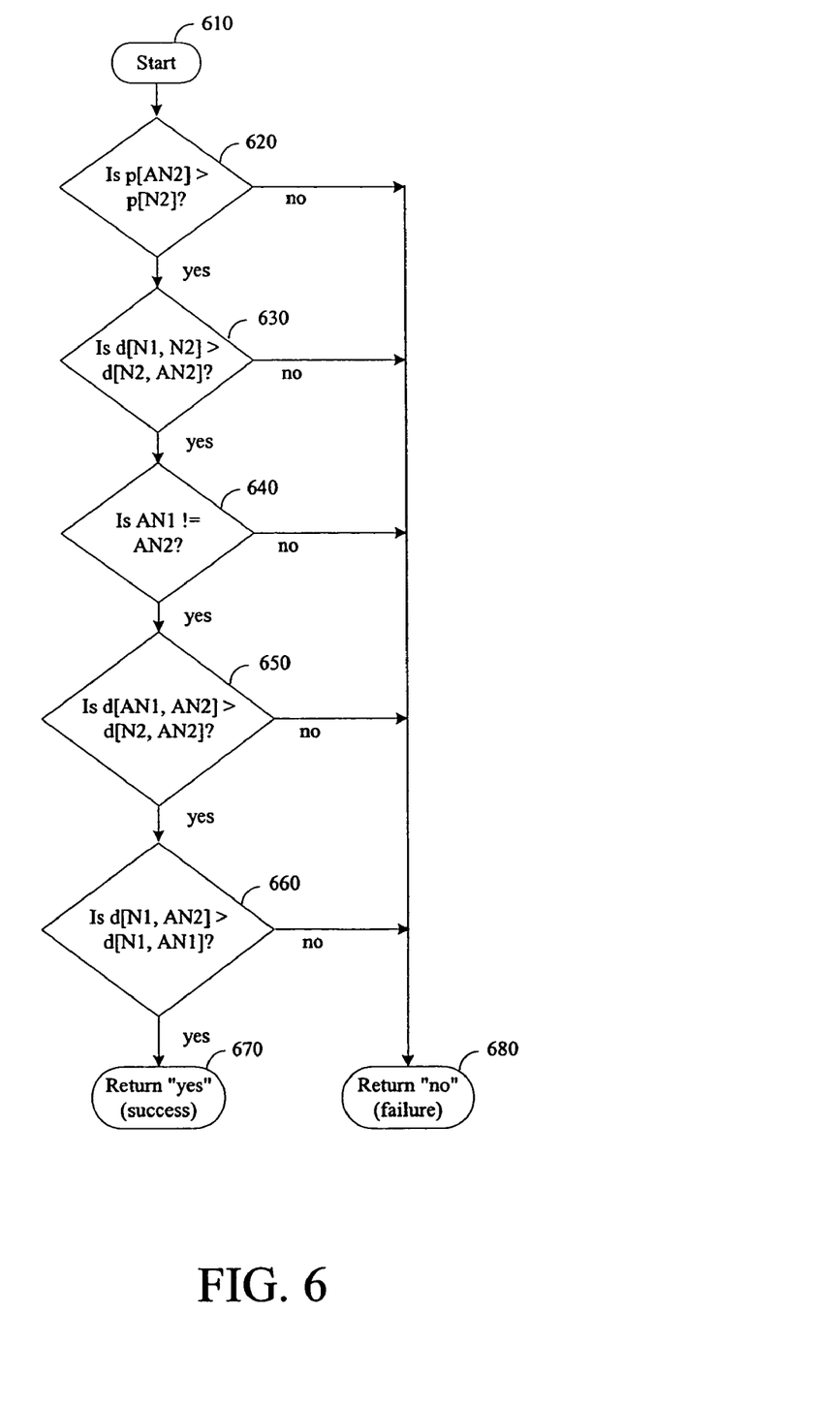
FIG. 6 shows an embodiment of a flowchart for FIG. 4 subprocess 450, which determines if a second adorning locality AN2 is a potential adornment for a second duplicate locality N2.

FIG. 6 shows an embodiment of a flowchart for FIG. 4 subprocess 450, which determines if a second adorning locality AN2 is a potential adornment for a second duplicate locality N2. The subprocess starts in step 610. If any of the decisions in FIG. 6 equate to no, in step 680, the process returns "no" or failure to FIG. 4. In step 620, using Rule 9 from FIG. 2, if p[AN2]>p[N2], meaning if AN2 is a more significant locality than N2, the subprocess then moves to step 630. In step 630, using Rule 3 from FIG. 2, if d[N1, N2]>d[N2, AN2], meaning if the distance from N1 to N2 is greater than the distance from N2 to AN2, the subprocess then moves to step 640. In step 640, using Rule 1 from FIG. 2, if AN1!=AN2, meaning if the name AN1 is not a duplicate of name AN2, the subprocess then moves to step 650. In step 650, using Rule 5 from FIG. 2, if d[AN1, AN2]>d[N2, AN2], meaning if the distance from AN1 to AN2 is greater than the distance from N2 to AN2, the subprocess then moves to step 660. In step 660, using Rule 6 from FIG. 2, if d[N1, AN2]>d[N1, AN1], meaning if the distance from N1 to AN2 is greater than the distance from N1 to AN1, the subprocess then returns "yes" or success to FIG. 4.

In step 450 of FIG. 4, if AN2 is not a potential adornment for N2, the subprocess goes back to step 435, in which the subprocess determines whether any more untried adorning localities AN2 exist that are closer to N2 than N1 is to N2, or where d[N1, N2]>d[AN2, N2]. If in step 435 the process determines that no more untried adorning localities AN2 exist that are closer to N2 than N1 is to N2, then in step 465, adornments AN1 and AN2 for N1 and N2, respectively, are determined manually through human inspection of a map. In step 470, N1 is adorned with AN1, and N2 is adorned with AN2. The subprocess then returns to FIG. 3 in step 480.

Figure 7:
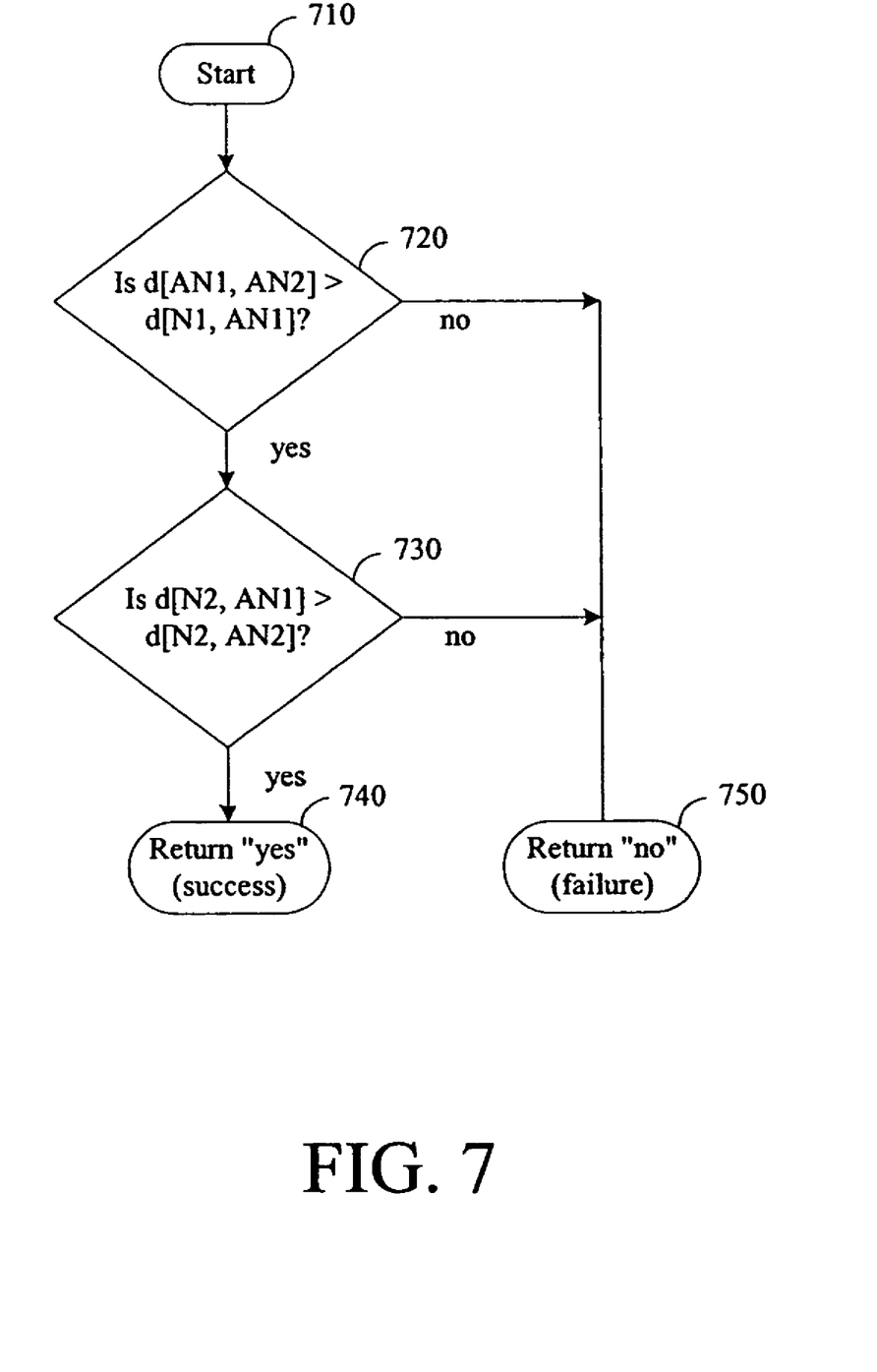
FIG. 7 shows an embodiment of a flowchart for FIG. 4 subprocess 460, which determines if both AN1 and AN2 are successful adornments for N1 and N2.

If in step 450 AN2 is a potential adornment for N2, then in step 460, the subprocess connects to FIG. 7 to determine if AN1 and AN2 are both successful adornments.

FIG. 7 shows an embodiment of a flowchart for FIG. 4 subprocess 460, which determines if both AN1 and AN2 are successful adornments for N1 and N2. The subprocess begins in step 710. In step 720, using Rule 4 from FIG. 2, if d[AN1, AN2]>d[N1, AN1], meaning if the distance from AN1 to AN2 is greater than the distance from N1 to AN1, the subprocess then proceeds to step 730. If in step 720 the distance from AN1 to AN2 is not greater than the distance from N1 to AN1, then in step 750, the subprocess returns "no" or failure to FIG. 4. In step 730, using Rule 7 from FIG. 2, if d[N2, AN1]>d[N2, AN2], meaning if the distance from N2 to AN1 is greater than the distance from N2 to AN2, then in step 740, the subprocess returns "yes" or success to FIG. 4. If in step 730 the distance from N2 to AN1 is not greater than the distance from N2 to AN2, then in step 750, the subprocess returns "no" or failure to FIG. 4.

If in step 460 of FIG. 4 AN1 and AN2 are not determined to be successful adornments, then the subprocess goes back to step 415 to re-process selecting potential adornments for both N1 and N2. If AN1 and AN2 are determined to be successful adornments in step 460, then in step 470, N1 is adorned with AN1, and N2 is adorned with AN2. The subprocess then returns to FIG. 3 in step 480.

Figure 9:
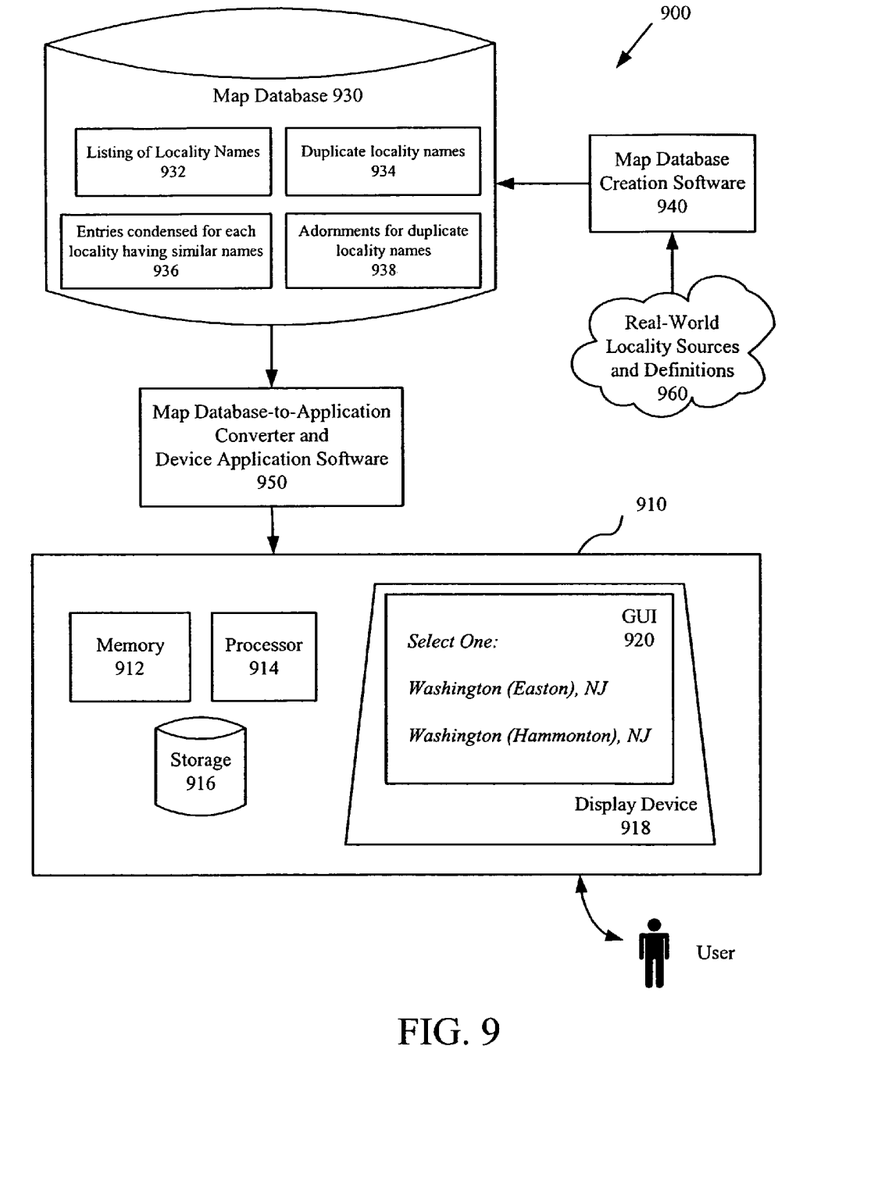
FIG. 9 shows a block diagram of an exemplary system 900 that can be used with embodiments of the invention.

Returning to FIG. 3 in step 345, the process in step 325 determines if another unadorned locality in the set of duplicate localities needs to be adorned. If there are no unadorned localities in the set of duplicate localities in step 325, the process then displays the duplicate localities and their adornments to the user in step 355. For an example pair of duplicate localities for Washington, New Jersey, the two localities will be adorned with names of nearby larger cities, Easton and Hammonton, N.J., respectively. FIG. 9 shows a computing device 910, which includes a display device 918 having a graphical user interface (GUI) 920. For the Washington, New Jersey, example, in step 355, Washington (Easton), N.J., and Washington (Hammonton), N.J., are displayed to the GUI 920 of FIG. 9. In this example, the adornments are presented in parentheses but can be presented in other ways, such as by using commas to separate each duplicate locality from its respective adornment. In step 360, the user selects one of the duplicate localities. In step 365, the locality is displayed to the user. The process then ends in step 370.

If in step 335 a second unadorned locality does not exist in the set of duplicate localities, at this point in the process, only one unadorned locality exists, and the last unadorned locality is processed in step 350. In step 350, the process connects to FIG. 8, in which an adornment AN1 is then found for N1.

Figure 8:
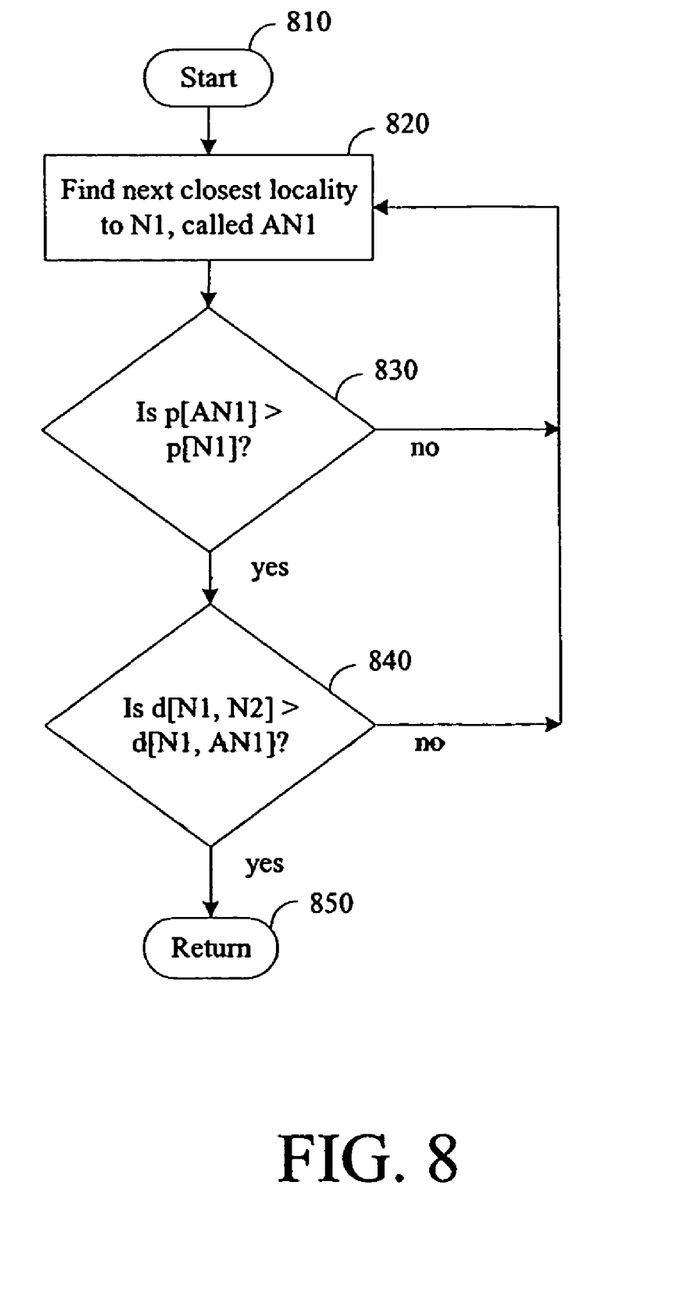
FIG. 8 shows an embodiment of a flowchart for FIG. 3 subprocess 350, which determines a potential adornment AN1 for a duplicate locality N1.

FIG. 8 shows an embodiment of a flowchart for FIG. 3 subprocess 350, which determines a potential adornment AN1 for a duplicate locality N1. The subprocess starts in step 810. The next closest locality to N1, called AN1, is found in step 820. If in step 830, taking Rule 8 from FIG. 2, if p[AN1] >p[N1], meaning that if AN1 is a more significant locality than N1, then the subprocess proceeds to step 840. If in step 830, AN1 is not a more significant locality than N1, the subprocess goes back to step 820. In step 840, taking Rule 2 from FIG. 2, if d[N1, N2]>d[N1, AN1], meaning that if the distance from N1 to N2 is greater than the distance from N1 to AN1, then in step 850, the process returns to FIG. 3. If in step 840, the distance from N1 to N2 is not greater than the distance from N1 to AN1, then the subprocess goes back to step 820.

Returning to FIG. 3, the process then displays the duplicate localities and their adornments to the user in step 355. Using the example pair of duplicate localities for Washington, New Jersey, above, the two localities will be adorned with names of nearby larger cities, Easton and Hammonton, N.J., respectively. FIG. 9 shows a computing device 910, which includes a display device 918 having a graphical user interface (GUI) 920. For the Washington, N.J., example, in step 355, Washington (Easton), N.J., and Washington (Hammonton), N.J., are displayed to the GUI 920 of FIG. 9. In this example, the adornments are presented in parentheses but can be presented in other ways, such as by using commas to separate each duplicate locality from its respective adornment. In step 360, the user selects one of the duplicate localities. In step 365, the locality is displayed to the user. The process then ends in step 370.

Embodiments of the invention carry out one or more steps automatically. The automatic feature is implemented using appropriate software. The automatic feature of the present invention creates a substantial increase in efficiency.

The adornment process can be applied internationally, regardless of a given locality's language, geography, etc.

A locality may be adorned with a nearby significant city or town for displaying to the user for the user's ease of use, even if not for the purpose of disambiguation of duplicate localities in an embodiment of the present invention. One example is for East Village, N.Y., which can be adorned with the nearby, significant city of Manhattan. Thus, East Village (Manhattan), N.Y. will be displayed to the user for the user's convenience.

Regarding map databases, a listing of locality names is indexed and stored in a map database for each principal geographic unit of interest, for example, each state in the United States of America in an embodiment of the present invention.

Duplicate yet disjoint localities will be indexed and stored in a map database as separate localities in one embodiment. According to embodiments of the invention, it is verified that duplicate locality names do not overlap and are not adjacent by examining the geographic items comprised in each and ensuring that there are no common geographic items.

Adornments for duplicate localities, as discussed above for FIGS. 2-8, will be indexed and stored in a map database in another embodiment of the invention.

For a locality having two or more similar names, in another embodiment, database entries for the locality will be condensed. These similar locality names can be administrative, postal, or colloquial. Using the Ho-Ho-Kus, N.J. example from above, the city appears as follows in various locality name sources:

TIGER Record Type C: Ho-Ho-Kus
USPS City State: HO HO KUS
POI Center of Settlement: HO-HO-KUS
FIPS55-3: Ho-Ho-Kus (Hohokus)
GNIS: Ho-Ho-Kus Map database entries for these similar names can be condensed by performing the steps of tokenizing, normalizing, optimizing and matching the two or more similar names in order to remove duplicate names for the locality.

For example, working with two similar names from the Ho-Ho-Kus, New Jersey example, tokenizing generally breaks the different names into pieces, up to about ten pieces. For example:

Body: Ho-Ho-Kus, Suffix: Twnshp and
Body: HO HO KUS, Suffix: Township

Normalizing generally expands abbreviations, reduces punctuation, removes embedded spaces and normalizes capitalization, producing these results:

Body: HOHOKUS, Suffix: TOWNSHIP and
Body: HOHOKUS, Suffix, TOWNSHIP

Optimizing generally associates each similar name with geographic features contained in the locality, such as streets, street segments, landmarks, state parks, highways, business locations and residential locations. In the Ho-Ho-Kus, New Jersey example, optimizing will find the same geographic features for Ho-Ho-Kus and for HO HO KUS.

Matching concatenates the tokens and compares them to determine if they can be considered a match. In the Ho-Ho-Kus, New Jersey example, the tokens concatenated together for each name are both "HOHOKUS TOWNSHIP" and are thus a match. This pair of similar names represent the same locality and will be indexed and stored as one entry into the map database. For a map database having many similar name entries, this technique will greatly reduce the amount of indexing and space required by the database.

FIG. 9 shows a block diagram of an exemplary system 900 that can be used with embodiments of the invention. Although this diagram depicts components as logically separate, such depiction is merely for illustrative purposes. It will be apparent to those skilled in the art that the components portrayed in this figure can be combined or divided into separate software, firmware and/or hardware components. Furthermore, it will also be apparent to those skilled in the art that such components, regardless of how they are combined or divided, can execute on the same computing device/system or can be distributed among different computing devices/systems connected by one or more networks or other suitable communication means.

As shown in FIG. 9, the system 900 typically includes a computing device 910 which may comprise one or more memories 912, one or more processors 914, and one or more storage devices or repositories 916 of some sort. The system 900 may further include a display device 918, including a graphical user interface or GUI 920 operating thereon by which the system can display maps and other information to a user. The user uses the computing device to request, for example, that a locality be displayed on a map or that driving directions be displayed as a route on a map and/or as text directions. The GUI 920 displays an example of a pair of duplicate localities for Washington, New Jersey, and their adornments Easton and Hammonton. The user will select one of the duplicate localities to be displayed to GUI 920.

A map database 930 is shown as external storage to computing device or system 910, but the map database 930 in some instances may be the same storage as storage 916. According to embodiments of the present invention, map database 930 contains a listing of locality names 932, from which a set of duplicate locality names 934 describing mutually disjoint localities is created. The duplicate locality names 934 are indexed and stored into map database 930. From the listing of locality names 932, database entries for each locality having one or more similar names which identify it will be condensed into entries for the single locality 936 in map database 930. Adornments 938, or names of nearby significant cities of the duplicate locality names 934, will be indexed and stored in the map database 930.

Proprietary map database creation software 940 will use real-world locality sources and definitions 960 to create the listing of locality names 932, the duplicate locality names 934, and the adornments 938, as well as condense database entries for each locality having similar names 936. Examples of real-world locality sources and definitions are described above in the discussion for FIG. 2. Information from the map database 930 is used by a map database-to-application converter and device application software 950, which is ultimately used by a user of the computing device 910. The map database-to-application converter and device application software 950 is shown remote to the user's computing device 910 but may also reside on the user's computing device 910.

Appropriate software coding can readily be prepared by skilled programmers based on the teachings of the present disclosure, as will be apparent to those skilled in the software art. Embodiments of the invention may also be implemented by the preparation of application specific integrated circuits or by interconnecting an appropriate network of conventional component circuits, as will be readily apparent to those skilled in the art.

Embodiments of the present invention include a computer program product which is a storage medium (media) having instructions stored thereon/in which can be used to program a computer to perform any of the processes of embodiments of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems, including molecular memory ICs, or any type of system or device suitable for storing instructions and/or data.

Stored on any one of the computer readable medium (media), embodiments of the present invention include software for controlling both the hardware of the general purpose/specialized computer or microprocessor, and for enabling the computer or microprocessor to interact with a human user or other mechanism utilizing the results of embodiments of the present invention. Such software may include, but is not limited to, device drivers, operating systems, and user applications. Ultimately, such computer readable media further includes software for performing embodiments of the present invention, as described above.

Included in the programming or software of the general/specialized computer or microprocessor are software modules for implementing the teachings of the present invention. Embodiments of the present invention may be conveniently implemented using a conventional general purpose or a specialized digital computer or microprocessor programmed according to the teachings of the present disclosure, as will be apparent to those skilled in the computer art.

The foregoing description of the present invention has been provided for the purposes of illustration and description. It is not intended to be exhaustive or to limit embodiments of the invention to the precise forms disclosed. Many modifications and variations will be apparent to a practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalents.

What is claimed is:

1. A method for differentiating duplicate yet disjoint localities within the same principal geographic unit of interest being one of a state, territory, province, district and county, said disjoint localities and said principal geographic unit of interest being described in a digital map database, comprising the steps of:

designating by a computing device, a first duplicate locality;

determining by the computing device a second duplicate locality that is closest to the first duplicate locality;

identifying first and second significant localities that are closer to the first and second duplicate localities, respectively, than the first duplicate locality is to the second duplicate locality, wherein the comparative significance of said duplicate localities and said significant localities is determined according to a prescribed metric, and the method includes the further step of providing a distinguishing name adornment for the first and second duplicate localities, said distinguishing name adornment being the first and second significant localities, respectively; and closeness is defined as one of a distance between centers of respective localities and a distance between geographic items associated with the respective localities.

2. The method of claim 1, further comprising the step of: repeating the steps of designating, determining, identifying and adorning for pairs of remaining unadorned duplicate localities, until no unadorned duplicate localities remain, and updating the digital map database accordingly.

3. The method of claim 1, wherein the localities comprise cities and towns.

4. The method of claim 1, wherein the geographic items comprise one or more of streets, street segments, landmarks, state parks, highways, business locations and residential locations.

5. The method of claim 1, wherein a significant locality is one of a locality name which can be found in a highest number of different locality name sources and a locality which has a highest number of geographic items.

6. The method of claim 1, wherein the significant locality comprises a primary sort of locality names for one which can be found in a highest number of different locality name sources, and if necessary, a secondary sort of localities for one which has a highest number of street segments corresponding to the locality name.

7. The method of claim 1, wherein the significant locality comprises the highest number of major geographic items.

8. The method of claim 7, wherein a major geographic item comprises an important highway.

9. The method of claim 1, wherein the principal geographic unit of interest comprises one of a state, territory, province, and district.

10. The method of claim 1, wherein the principal geographic unit of interest is a state, and the method is implemented within the United States.

11. The method of claim 1, wherein the principal geographic unit of interest is a province, and the method is implemented within Canada.

12. The method of claim 1, wherein the principal geographic unit of interest is a county, and the method is implemented within the United Kingdom.

13. The method of claim 1, wherein the first and second duplicate localities and the first and second significant localities are located within the principal geographic unit of interest.

14. A system for enabling a user to differentiate between duplicate yet disjoint localities within the same principal geographic unit of interest, being one of a state, territory, province, district and county, comprising: a digital map database having a set of duplicate locality name entries for each set of duplicate yet mutually disjoint localities;

a processor; and a memory storing an application program when executed by the processor causes the processor to search within said database and to perform the steps of:

identifying a first duplicate locality and a second duplicate locality that is closest to the first duplicate locality;

identifying first and second significant localities that are closer to the first and second duplicate localities, respectively, than the first duplicate locality is to the second duplicate locality, wherein the comparative significance of said duplicate localities and said significant localities is determined according to a prescribed metric, provides a distinguishing name adornment for the first and second duplicate localities, said distinguishing name adornment being the first and second significant localities, respectively;

displaying the duplicate localities and their respective adornments to a user; and wherein closeness is defined as one of a distance between centers of respective localities and a distance between geographic items associated with the respective localities.

15. The system of claim 14, wherein the system comprises an Internet-based system.

16. The system of claim 14, wherein the system comprises an in-vehicle navigation system.

17. The system of claim 14, wherein the system is constituted by a portable hand-held device being one of: a personal digital assistant (PDA), a personal navigation device or a cell phone.

18. A machine-readable storage device, including operations stored thereon that, when processed by one or more processors, causes a system to perform the steps of:

receiving a listing of locality names from a digital map database;

generating a set of duplicate locality name database entries from the listing of locality names describing mutually disjoint localities within the same principal geographic unit of interest being one of a state, territory, province, district and county;

identifying first and second significant localities that are closer to the first and second duplicate localities, respectively, than the first duplicate locality is to the second duplicate locality, the comparative significance of said duplicate localities and said significant localities being determined according to a prescribed metric, and providing a distinguishing name adornment for the first and second duplicate localities, said distinguishing name adornment being the first and second significant localities, respectively, and wherein closeness is defined as one of a distance between centers of respective localities and a distance between geographic items associated with the respective localities.

* * * * *